United States Patent Office 3,341,475
Patented Sept. 12, 1967

3,341,475
VULCANIZABLE COPOLYMERS OF OXETANES AND HALOGEN SUBSTITUTED EPOXIDES
Edwin J. Vandenberg, Wilmington, Del., assignor to Hercules Incorporated, a corporation of Delaware
No Drawing. Filed Aug. 28, 1962, Ser. No. 220,025
11 Claims. (Cl. 260—2)

This application is a continuation-in-part of my U.S. application Ser. No. 75,487, filed Dec. 13, 1960, now Patent No. 3,205,183.

This invention relates to essentially linear, high molecular weight, vulcanizable copolymers of oxetanes and halogen-substituted epoxides as new compositions of matter. More particularly, this invention relates to such copolymers which are elastomeric and are derived from mixtures of halogen-substituted epoxide monomers and flexibilizing oxetane monomers, with or without other epoxide monomers which yield rubbery polymers, such as the alkylene oxides and saturated glycidyl ethers. Oxetanes are those compounds which are characterized by the presence therein of an oxacyclobutane ring,

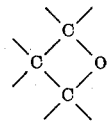

and epoxides, also termed oxiranes, are characterized by the presence therein of an oxirane ring,

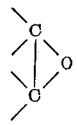

The principal object of the invention is to provide new elastomeric copolymers from which vulcanized rubbery products can be made having a variety of uses, particularly in applications where low temperature flexibility, solvent resistance and stability to heat, light, and ozone, combined with good dynamic properties such as low heat buildup, etc., are desired.

This object and others are accomplished in accordance with this invention by the discovery of essentially linear, elastomeric polyether copolymers of at least about 4% and not more than about 90% by weight of flexibilizing oxetane, at least about 10% and not more than about 96% by weight of epoxide containing at least one aliphatic halogen group, and not more than about 75% by weight of epoxide having the formula

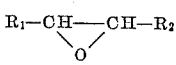

in which $R_1$ and $R_2$ are radicals selected from the group consisting of hydrogen, alkyl, alkoxyalkyl, and phenyl radicals, said copolymer having a weight average molecular weight of at least about 50,000, and preferably at least about 100,000. For copolymers having 50% or more of halogen-substituted epoxide, molecular weights of this order usually correspond to reduced specific viscosity (RSV) of at least about 0.2 and preferably at least about 0.5 as measured in a 0.1% by weight solution of the copolymer in α-chloronaphthalene at 100° C. For copolymers containing less than about 50% of halogen-substituted epoxide, molecular weights of this order usually correspond to reduced specific viscosity of at least about 0.5 and preferably at least about 1 as measured on a 0.1% by weight solution of the copolymer in α-chloronaphthalene at 100° C.

This invention, therefore, contemplates high molecular weight, elastomeric copolymers derived solely from mixtures of monomeric oxetanes and halogen-substituted epoxide monomers, as well as such copolymers derived from mixtures of monomeric oxetanes and halogen-substituted epoxide monomers together with monomeric epoxides which do not contain any halogen-substituent groups, and the new copolymers of this invention may be binary, copolymers, ternary copolymers, quaternary copolymers, etc.

It is a characteristic of the new copolymers of this invention that they are essentially linear elastomeric polyethers, consisting essentially of linear open chain alkylene ether repeating units, wherein the repeating units are linked or connected together by ether linkages from the carbon on one repeating unit to an oxygen on an adjoining repeating unit. Copolymerization of a mixture of oxetane monomers and epoxide monomers, therefore, involves only the characteristic oxetane and oxirane rings of the respective oxetane and epoxide monomers, whereby a substantially linear polyether molecule is formed by opening of the oxetane and oxirane rings in each of the respective oxetane and epoxide monomeric molecules and joining of the plurality of the resulting acyclic repeating units by linear ether linkages.

An essential characteristic of these new copolymers is that at least about 4% and not more than about 90% by weight, preferably at least about 10% and preferably not more than about 75% by weight, of the repeating units thereof are derived from flexibilizing oxetane monomers having the general formula:

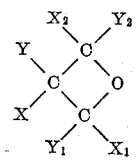

(1) in which all X, $X_1$, $X_2$, Y, $Y_1$, and $Y_2$ substituents are hydrogen;
(2) in which one of the X, $X_1$, $X_2$, Y, $Y_1$, and $Y_2$ substituents is selected from the group consisting of alkyl, alkoxy, alkoxymethyl, haloalkyl, haloalkoxy, and haloalkoxymethyl radicals, the remainder of said substituents being hydrogen; and
(3) in which the X and Y substituents are each in alkyl radical, the remaining $X_1$, $X_2$, $Y_1$, and $Y_2$ substituents being hydrogen.

By way of example, but not in limitation of the invention, therefore, suitable X, $X_1$, $X_2$, Y, $Y_1$, and $Y_2$ substituent groups include in addition to hydrogen, alkyl radicals such as methyl, ethyl, propyl, isopropyl, butyl, pentyl, octyl, and the like; alkoxy radicals such as methoxy, ethoxy, propoxy, isopropoxy, butoxy, pentoxy, octoxy, and the like; alkoxymethyl radicals such as methoxymethyl, ethoxymethyl, propoxymethyl, octoxymethyl, and the like; haloalkyl radicals such as fluoromethyl, chloromethyl, bromomethyl, iodomethyl, fluoroethyl, chloroethyl, bromoethyl, iodoethyl, fluoropropyl, chlorobutyl, bromopentyl, iodooctyl, bromodecyl, trifluoromethyl, trichloroethyl, dichloroethyl, and the like; haloalkoxy radicals such as fluoromethoxy, bromoethoxy, chloromethoxy, chloroethoxy, chloropropoxy, iodobutoxy, fluorooctoxy, chlorodecoxy, and the like; and haloalkoxymethyl radicals such as fluoromethoxymethyl, chloromethoxymethyl, fluoroethoxymethyl, bromoisopropoxymethyl, iodobutoxymethyl, chlorooctoxymethyl, and the like.

Typical flexibilizing oxetane monomers which can be copolymerized with halogen-substituted epoxide monomers to form the new high molecular weight polyether copolymers of this invention include, by way of example, oxetane, also designated as trimethylene oxide,

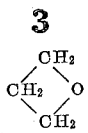

in which all X, X₁, X₂, Y, Y₁, and Y₂ substituents are hydrogen; various mono-substituted oxetanes in the 2- and 3-positions, such as 2-methyloxetane,
2-ehyloxetne,
2-propyloxetane,
2-butoxyloxetane,
2-octyloxetane, and the like;
2-methoxyoxetane,
2-ethoxyoxetane,
2-propoxyoxetane,
2-hexoxyoxetane, and the like;
2-methoxymethyloxetane,
2-ethoxymethyloxetane,
2-butoxymethyloxetane,
2-decoxymethyloxetane, and the like;
2-chloromethyloxetane,
2-bromoethyloxetane,
2-fluoromethyloxetane,
2-trifluoromethyloxetane,
2-iodopropyloxetane,
2-chlorobutyloxetane, and the like;
2-fluoromethoxyoxetane,
2-chloromethoxyoxetane,
2-bromomethoxyoxetane,
2-iodomethoxyoxetane,
2-chloroethoxyoxetane,
2-bromobutoxyoxetane
2-fluorooceoxyoxetane, and the like;
2-fluoromethoxymethyloxetane,
2-chloroethooxymethoxyoxetane,
2-bromoisopropoxymethyloxetane,
2-iodobutoxymethyloxetane,
2-fluorohexoxymethyloxetane,
2-chlorodecoxymethyloxetane, and the like;
3-methyloxetane,
3-ethyloxetane,
3-propyloxetane,
3-butyloxetane,
3-octyloxetane, and the like;
3-methoxyoxetane,
3-ethoxyoxetane,
3-propoxyoxetane,
3-hexoxyoxetane, and the like;
3-methoxymethyloxetane,
3-ethoxymethyloxetane,
3-butoxymethyloxetane,
3-decoxymethyloxetane, and the like;
3-chloromethyloxetane,
3-bromoethyloxetane,
3-fluoromethyloxetane,
3-trifluoromethyloxetane,
3-iodopropyloxetane,
3-chlorobutyloxetane, and the like;
3-fluoromethoxyoxetane,
3-chloromethoxyoxetane,
3-bromomethoxyoxetane,
3-iodomethoxyoxetane,
3-chloroethoxyoxetane,
3-bromobutoxyoxetane,
3-fluorooctoxyoxetane, and the like;
3-fluoromethoxymethyloxetane,
3-chloroethoxymethyloxetane,
3-bromoisopropoxymethyloxetane,
3-iodobutoxymethyloxetane,
3-fluorohexoxymethyloxetane,
3-chlorodecoxpmethyloxetane, and the like;

and various 3,3-dialkyl substituted oxetanes such as 3,3-dimethyloxetane,
3,3-diethyloxetane,
3,3-dipropyloxetane,
3,3-diisopropyloxetane,
3,3-dibutoxyoxetane,
3,3-dioctyloxetane,
3-methyl-3-ethyloxetane,
3-methyl-3-propyloxetane,
3-ethyl-3-butoxyoxetane,
3-isopropyl-3-propyloxetane,
3-butyl-3-methyloxetane,
3-propyl-3-hexyloxetane, and the like.

It will be evident, of course, that mono-substituted oxetanes in the 4- position will be identical to similarly mono-substituted oxetanes in the 2- position.

Any one, or a mixture in any proportion of two or more, flexibilizing type oxetane monomers as herein described may be employed in preparing the new copolymers of this invention. A particularly preferred species of the flexibilizing type of oxetane monomer is trimethylene oxide,

since it contributes the ultimate in chain flexibility with good solvent resistance. Other highly preferred flexibilizing oxetanes are the 2-alkyl oxetanes, the 3-alkyl oxetanes, and the 3-3-dialkyl oxetanes.

Another essential characteristic of the new copolymers of this invention is that at least about 10% and not more than about 96% by weight, preferably at least about 25% and preferably not more than about 90%, of the repeating units thereof are derived from epoxide monomers containing at least one aliphatic halogen group. The halogen-containing epoxides which can be used in the preparation of these copolymers have the formula

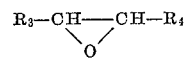

in which $R_3$ and $R_4$ are radicals selected from the group consisting of hydrogen, alkyl, haloalkyl, and haloalkoxylalkyl radicals, at least one of said $R_3$ and $R_4$ radicals being selected from the group consisting of haloalkyl and haloalkoxylalkyl radicals. Those halogen-containing epoxides having the formula

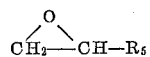

in which $R_5$ is either haloalkyl or haloalkoxyalkyl are most preferred. Typical halogen-containing epoxide monomers which can be copolymerized with flexibilizing oxetane monomers to form the new high molecular weight polyether copolymers of this invention include, by way of example, the epihalohydrins such as epichlorohydrin,
epibromohydrin,
epifluorohydrin and,
epiiodohydrin;

haloalkyl glycidyl ethers such as 2-2bis(chloromethyl)ethyl glycidyl ether,
2-chloroethyl glycidyl ether,
2-bromoethyl glpcidyl ether,
2-chloro-1-methylethyl glycidyl ether,
2,2,2-tris-(chloromethyl)ethyl glycidyl ether, and the like;

haloalkylene oxides such as 1,2-dichloro-3,4-epoxybutane,
1-chloro-3,4-epoxybutane,
1-chloro-4,5-epoxypentane,
1,1-dichloro-2,3-epoxypropane,
1,1,1-trichloro-2,3-epoxypropane,
1,1,1-trichloro-3,4-epoxybutane,
1,1,1-trifluoro-2,3-epoxypropane,
cis- and trans-1,4-dichloro-2,3-epoxybutane, and the like;

Any one, or a mixture in any proportion of two or more, halogen containing epoxide monomers as herein described may be employed in preparing the new copolymers of this invention.

If desired, part of the repeating units of the new copolymers of this invention, at most not more than 75% by weight, preferably not more than 50% by weight, and still more preferably not more than 30% by weight, may be derived from epoxide monomers having the formula

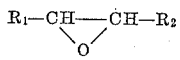

in which $R_1$ and $R_2$ are radicals selected from the group consisting of hydrogen, alkyl, alkoxyalkyl, and phenyl radicals. Typical epoxide monomers of this type include, by way of example, the alkylene oxides such as ethylene oxide, propylene oxide, cis- and trans-butene-2-oxide, preferably the cis- configuration, butene-1 epoxide, cis- and trans-pentene-2 oxide, cis- and trans-hexene-2 oxide, cis- and trans-hexene-3 oxide, cyclohexene oxide, and the like; phenyl alkylene oxides such as styrene oxide, and the like; and saturated glycidyl ethers such as methyl glycidyl ether, ethyl glycidyl ether, methylethyl glycidyl ether, butyl glycidyl ether, phenyl glycidyl ether, and the like. For general purpose use, ethylene oxide should be limited to that amount which does not contribute excessive water sensitivity. Usually this will be less than about 10%, preferably less than about 5% by weight. On the other hand, for uses where a water-soluble or water-swellable elastomer is desired, then large amounts of ethylene oxide, on the order of 50% by weight or even more, are necessary. The exact amounts will, of course, depend on the particular co-monomers being used.

The new polyether copolymers of this invention may be prepared by contacting mixtures of oxetane monomers and halogen-substituted epoxide monomers, with or without other epoxide monomers as herein described which do not have any halogen substituent groups, with a catalyst formed by reacting an organoaluminum compound with from about 0.1 mole to about 1.5 moles of water per mole of organoaluminum compound. The new polyether copolymers of this invention may also be prepared by contacting a mixture of monomers as set forth above with a catalyst formed by reacting an organoaluminum compound with from about 0.01 mole to about 2 moles of a chelating agent such as acetylacetone, trifluoroacetylacetone, ethoxyacetic acid, etc., and with from about 0.1 mole to about 1.5 moles of water per mole of organoaluminum compound. Exemplary of organoaluminum compounds that may be so reacted with water, or with a chelating agent and with water and used as the catalyst are triethylaluminum, tripropylaluminum, triisobutylaluminum, trioctylaluminum, diethylaluminum hydride, diisobutylaluminum hydride, etc. A typical catalyst of the first type for the purposes of this invention is the product obtained by reacting 1 mole of triisobutylaluminum with 0.5 mole of water. A typical catalyst of the second type is the product obtained by reacting 1 mole of triethylaluminum with 1 mole of acetylacetone and with 0.5 mole of water.

It will be evident to those skilled in the art that the monomers employed in any particular polymerization should be added in such a manner as to yield uniform copolymers, and the particular method employed will depend on the copolymerization reactivity ratio of the monomers for each system. Depending on the requirements for uniform copolymerization the monomers may all be added at one time at the start of the polymerization, or they may be added continuously as the polymerization proceeds. In other cases it may be found advisable to add one or more of the monomers at the beginning of the polymerization, and another monomer continuously or at intervals as the polymerization proceeds.

The polymerization may be carried out under a considerable range of conditions by any desired means, either as a batch or continuous process. Preferably the polymerization reaction will be conducted under conditions which exclude excessive moisture and air, and this can be most conveniently accomplished in vessels closed to the atmosphere. Under conditions where diluent polymerization reactions are desired, the diluents of utility are those that do not react either with the monomers or the catalyst. Such diluents include, by way of example, aromatic hydrocarbons such as benzene, toluene, etc., aliphatic hydrocarbons and cycloaliphtic hydrocarbons such as n-heptane, cyclohexane, etc., halogenated hydrocarbons such as chlorobenzene or haloalkanes such as methyl chloride, methylene chloride, chloroform, carbon tetrachloride, ethylene dichloride, tetrachloroethane, etc., and ethers such as the dialkyl, aryl or cycloalkyl ethers as, for example, diethyl ether, dipropyl ether, diisopropyl ether, methyl ether, methyl phenyl ether, methyl cyclohexyl ether, etc. Any desired mixture of such diluents may be used.

The polymerization reaction may also be carried out as a continuous bulk polymerization at elevated temperatures, usually in the range of polymer melt temperatures. For such bulk polymerization the method described in U.S. Patent 2,994,668 is quite useful for preparing the new copolymers of this invention.

Polymerization temperature in accordance with this invention can be varied over a wide range from about $-80°$ C. to about $300°$ C., suitable temperatures below about $100°$ C., for example, being convenient when conducting diluent polymerization reactions. Bulk polymerizations, however, will be preferably carried out at temperatures from about $100°$ C. to about $260°$ C., and particularly in the range of polymer melt temperatures.

The high molecular weight copolymers of this invention may be separated from the polymerization reaction mass by standard conventional procedures. The catalyst employed may be removed by appropriate treatments or it may simply be deactivated with an appropriate agent such as alcohol, water, air, or ammonia and left in the final product. For example, when conducting diluent polymerization, the copolymer, if insoluble, may be collected, washed with an aqueous acid to extract catalyst residues, then washed free of acid with water, stabilized if necessary or desired, and then dried, usually in vacuo or in an inert atmosphere at any convenient temperature. If the copolymer is soluble in the polymerization reaction mixture, then the copolymer solution may be washed with an immiscible aqueous acid to extract catalyst residues, then washed free of acid with extractive water washes, stabilized if necessary or desirable, and the copolymer recovered by evaporating the mixture to dryness, preferably in vacuo. In bulk polymerization, the molten reaction mixture is either quenched in a copolymer nonsolvent such as methanol, water, and the like, or the mass may be cooled, ground, and if necessary or desired, washed and then dried as set forth above for treatment of copolymer prepared by diluent polymerization.

Polymerization reaction time may be varied over a very wide range from a few minutes, for example, about 5 minutes, to several hours or even days with no detrimental effects under conditions where a prolonged reaction time is required or desired. Generally, diluent polymerizations require considerably longer reaction time than bulk polymerization at polymer melt temperatures.

The amount of catalyst employed to catalyze copolymerization of oxetane and epoxide monomers in accordance with this invention can range from a minute catalytic amount up to a large excess, and amounts from about 10 p.p.m. to about 100,000 p.p.m., based on total monomer weight, can be employed, the larger amounts in excess of about 15,000 p.p.m. having been employed in diluent polymerizations. In general, for bulk polymerizations the amount of catalyst employed will be within the range of from about 10 p.p.m. to about 15,000 p.p.m., based on the weight of monomers, and preferably from about 100 p.p.m. to about 1,000 p.p.m. Impurities such as carbon dioxide, oxygen, aldehydes, alcohols, etc., which tend to react with the catalysts should be kept at as low a level as possible to minimize unnecessary catalyst consumption. However, irrespective of the type of conditions of polymerization chosen, the amount of catalyst employed will be sufficient to catalyze copolymerization of oxetanes with epoxides to copolymers having a weight average molecular weight of at least about 50,000, and preferably at least about 100,000. As pointed out previously, molecular weights of this order usually correspond to reduced specific viscosity of at least about 0.2, preferably at least about 0.5 for copolymers containing a major amount of halogen-containing epoxide. For copolymers containing less than about 50% of halogen-containing epoxide, reduced specific viscosity corresponding to molecular weights of this order usually will be at least about 0.5 and preferably at least about 1. Reduced specific viscosities are generally determined on solutions of the copolymers at 0.1% concentration in α-chloronaphthalene at 100° C., although copolymers high in fluorine-containing epoxide are preferably determined on solutions thereof at 0.1% concentration in cyclohexanone at 50° C.

In the expression $\eta sp/C$ for defining reduced specfic viscosity, the symbol $\eta sp$ stands for specific viscosity and the symbol C stands for concentration of the copolymer in the solution thereof in solvent expressed as grams per 100 ml. of solution. Specific viscosity, $\eta sp$, is obtained by dividing the difference between the viscosity of the copolymer solution and the viscosity of the solvent used therein by the viscosity of the solvent.

Most of the new copolymers of this invention are insoluble in water, exceptions being copolymers high in ethylene oxide content, but are soluble in at least some organic solvents, particularly chloroform, methylene chloride, acetone, cyclohexanone, benzene and toluene. Some of these new copolymers having a high proportion of repeating units derived from 3,3-dimethyloxetane are soluble in aliphatic hydrocarbons. The copolymers containing substantial amounts of trimethylene oxide are unusual in that they are insoluble in n-heptane and in methanol, and they are also superior elastomers, since all of the atoms are part of the main polymer chain (no branch chain) and thus offer the ultimate in chain flexibility of all known water-insoluble elastomers.

In the unvulcanized state these new copolymers may be highly crystalline or largely amorphous, depending upon composition. For example, crystallinity in the copolymer can increase with increasing amount of chlorine-containing epoxide, and copolymers containing on the order of 90% or more of a chlorine-containing epoxide can be highly crystalline and in this form suitable for the formation of film which can be oriented by cold drawing. Conversely, these polymers tend to become more amorphous with increasing content of flexibilizing oxetane, with or without epoxide monomers which yield highly rubbery polymers, such as the alkylene oxides and saturated glycidyl ethers. Such copolymers which are largely amorphous are often tough, snappy rubbers in the unvulcanized state. However, although largely amorphous copolymers are preferred for best rubbery characteristics, some degree of crystallinity in the copolymer is somewhat advantageous in some instances. The amount of such crystallinity should not exceed that amount which interferes materially with rubbery properties, however, and will usually be below about 25% and preferably below about 15%, as determined by X-ray diffraction analysis. However, this does not preclude relatively high crystallinity in the unvulcanized copolymer, since crystallinity in the vulcanized copolymer under use conditions is the really important criterion. Thus, it is entirely feasible for a highly crystalline copolymer at normal temperature unvulcanized to have low crystallinity when vulcanized, particularly if plasticized. Also, a highly crystalline copolymer may be used vulcanized at a temperature above the crystalline melting point of the unvulcanized copolymer, and thus be largely amorphous under use conditions. Higher crystallinities, of course, may appear on stretching, and is desirable in many cases.

The new copolymers of this invention are generally elastomeric products which are readily processed on conventional rubber equipment and can be vulcanized to produce excellent rubbers which have outstanding properties, particularly in good overall mechanical properties, combined with low temperature flexibility, solvent resistance, stability to heat, light an dozone, and good dynamic properties such as improved hysteresis behavior, low heat buildup, etc. Such vulcanized products are useful in the many areas of utility for vulcanized rubbers, as for example, tires, hose, gasketing, mechanical rubber goods, etc. Those vulcanized copolymers which contain substantial amounts of halogen-containing epoxide are especially outstanding as solvent resistant and flame resistant elastomers. These vulcanized copolymers give low heat buildup on flexing, and are outstanding in aging resistance. This includes ordinary outdoor exposure, ozone resistance and heat aging in air up to temperatures of 125° C. or higher. Another property of these vulcanized copolymers is their low flex cut growth.

These new copolymers can be advantageously extended with various hydrocarbon oils, especially of the aromatic type, or plasticizers, and can be reinforced with a variety of carbon blacks, silicas, clays, mineral fillers, etc. Stabilizers such as conventional antioxidants and acid acceptors are also advantageously added to the copolymer to further improve storage and use stability. Particularly effective stabilizers for the copolymers of this invention are mixtures of from about 3% to about 25% by weight of the copolymer of at least one lead compound of the group consisting of the lead salts of carbonic acid, the lead salts of unsaturated aliphatic carboxylic acids, the lead salts of aromatic carboxylic acids and the lead oxides in combination with from about 0.1% to about 5% by weight of the copolymer of at least one nitrogen-containing antioxidant. Typical lead compounds for such stabilizing admixtures include, for example, lead carbonate, basic lead carbonate $2PbCO_3 \cdot Pb(OH)_2$, tribasic lead maleate, dibasic lead phthalate, lead dihydroabietate, lead suboxide $Pb_2O$, lead monoxide PbO, lead dioxide $PbO_2$, lead sesquioxide $Pb_2O_3$, read lead $Pb_3O_4$, and the like. Typical nitrogen-containing antioxidants for such stabilizing admixtures include, for example, phenyl-β-naphthylamine, di-β-naphthyl-p-phenylenediamine, sym-di-β-naphthyl-p-phenylene diamine, N-isooctyl-p-aminophenol, the reaction product of diphenylamine and acetone, poilymerized trimethyldihydroquinoline, and the like. The specific materials utilized and their method of incorporation will, of course, depend on the intermedite and the finished products desired.

Vulcanization, or cross-linking, can readily be carried out by means of a polyamine. Any amine containing two or more amino groups can be used as, for example, ethylenediamine, tetramethylenediamine, hexamethylenediamine, piperazine, etc. Particularly useful are the salts of such amines such as hexamethylenediamine carbamate. The amine can be simply blended with the copolymer and the mixture then cured at elevated temperture as, for example, at a temperature of from about 120° C. to about 175° C. for about 20 to about 40 minutes. Another method of vulcanizing these copolymers is to heat a mixture of the copolymer, an amine, sulfur, and a sulfur compound, such as a dithiocarbamate, a dialkyl thiuram disulfide, a tetraalkyl thiuram mono- or disulfide, or a thiazole, to a temperature from about 120° C. to about 175° C. for about 20 to about 40 minutes. Other agents known to vulcanize epihalohydrin polymers or chlorine-containing polymers may be advantageously used.

The copolymers of this invention, by virtue of their halogen groups, can be employed in reactions which yield new and useful derived polymers. For example, they can be reacted with a tertiary amine to produce quaternized derivatives that are soluble in water and exhibit cationic properties, or they can be reacted with thiourea to give thiouronium salts which can be decomposed to mercaptan derivatives. These new copolymers can also be used as polymeric plasticizers for polyepihalohydrins, poly(vinyl chloride), etc.

The general nature of the invention having been set forth, the following examples illustrate some specific embodiments of the invention. It is to be understand, however, that the invention is in no way limited to the examples, since this invention may be carried out by the use of various modifications and changes within the scope of the invention as herein set forth and described. All parts in the following examples are by weight, unless otherwise designated.

Example 1

A polymerization vessel in which air had been replaced with nitrogen was charged with 73 parts of toluene, 10 parts of epichlorohydrin and 10 parts of trimethylene oxide,

and the vessel and contents were adjusted to 65° C. Then, while at 65° C., a chelated reaction product made from 1 mole triethylaluminum—0.5 mole water—0.5 mole acetylacetone dissolved in n-heptane and diethylether and equivalent to 0.92 part of triethylaluminum was added as catalyst, and the polymerization reaction mixture was agitated for 7.5 hours at 65° C.

The catalyst for this example was prepared by adding 7.2 parts of diethylether to a solution of 0.92 part of triethylaluminum dissolved in 3.2 parts of n-heptane. Then, at 0° C., 0.072 part of water was added over a period of 30 minutes at 0° C., whereupon 0.4 part of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped by adding 8 parts of anhydrous ethanol. The reaction mixture was then diluted with 4 volumes of ether per volume of reaction mixture, and an etherinsoluble copolymer was collected, washed twice with ether, washed once with ethanol containing 1% HCl, then washed with methanol until neutral, and finally washed once with methanol containing 0.2% of 4,4'-thiobis(6-tert-butyl-m-cresol). The washed product was dried in vacuum for 16 hours at 80° C. The resulting copolymer, obtained in 6% yield based on the weight of the mixture of starting monomers, was a white rubbery solid having a reduced specific viscosity, $\eta sp/C$, of 3.9 as determined on a 0.1% solution of the copolymer in α-chloronaphthalene at 100° C. Analysis of the copolymer showed that it contained 33.8% chlorine, and thus contained 88% epichlorohydrin and 12% trimethylene oxide. X-ray analysis indicated the copolymer to be largely amorphous.

The ether-diluted reaction mixture, after separation from the ether-insoluble copolymer, was combined with the ether washes from the work-up of the ether-insoluble copolymer and the resultant mixture was washed first with water containing 3% of hydrogen chloride for 1 hour with stirring, then with water until neutral, then with water containing 2% of sodium bicarbonate, and again with water until neutral. The washed mixture was then concentrated by evaporation to a relatively small volume for convenience in handling, and 5 volumes of n-heptane per volume of concentrated mixture were added to precipitate an ether-soluble, heptane-insoluble copolymer which was collected, washed twice with heptane and once with heptane containing 0.2% of 4,4'-thiobis(6-tert-butyl-m-cresol). The washed ether-soluble, heptane-insoluble copolymer was dried 16 hours in vacuum at 80° C. The resulting dried copolymer, obtained in 11% yield based on the weight of the mixture of starting monomers, was a tough, snappy rubber having a reduced specific viscosity, $\eta sp/C$, of 1 as determined on a 0.1% solution of the copolymer in α-chloronaphthalene at 100° C. Chlorine analysis indicated the ether-soluble, heptane-insoluble copolymer to contain 45% epichlorohydrin and 55% trimethylene oxide. X-ray analysis indicated the copolymer to be amorphous.

A sample of the ether-insoluble copolymer was cured for 40 minutes at 310° F. in the following vulcanization formula:

| Ingredients: | Parts |
|---|---|
| Ether-insoluble copolymer | 100 |
| Tri-n-butylamine | 10 |
| Mercaptobenzothiazole | 1.5 |
| Sulfur | 2 |
| Zinc oxide | 3 |
| Stearic acid | 2 |

The vulcanized specimen gave 97% gel and 600% swell in toluene (4 hours at 80° C.).

A sample of the ether-soluble, heptane-insoluble copolymer was cured for 40 minutes at 310° F. in the following vulcanization formula:

| Ingredients: | Parts |
|---|---|
| Ether-soluble, heptane-insoluble copolymer | 100 |
| Hexamethylenediamine carbamate | 2 |

The vulcanized specimen gave 86% gel and 605% swell in toluene (4 hours at 80° C.).

Example 2

A polymerization vessel in which air had been replaced with nitrogen was charged with 73 parts of toluene, 16 parts of trimethylene oxide and 4 parts of epichlorohydrin and the vessel and contents were adjusted to 50° C. The same catalyst in the same amount, as described in Example 1, was added to the above mixture of monomers in toluene, and the polymerization reaction mixture was agitated for 16 hours at 50° C. A total solids determination on the reaction mixture indicated 28% conversion to a very snappy rubber.

The polymerization was stopped by adding 8 parts of anhydrous ethanol. The reaction mixture was then diluted with 4 volumes of n-heptane per volume of reaction mixture, and a heptane-insoluble copolymer was collected, washed twice with n-heptane, washed once with methanol containing 0.5% of hydrogen chloride, washed neutral with methanol, washed once with methanol containing 0.1% of 4,4'-thiobis(6-tert-butyl-m-cresol), and the washed copolymer was dried 16 hours at 80° C. in vacuum. The resulting dried copolymer, obtained in 17.2% yield based on the weight of the mixture of starting monomers, was a tough, snappy rubber having a reduced specific viscosity, $\eta sp/C$, of 10.0 as determined on a 0.1% solution of the copolymer in α-chloronaphthalene at 100° C. Analysis of the copolymer showed that it contained 10.9% chlorine, and thus contained 28.3% epichlorohydrin and 71.7% trimethylene oxide. X-ray analysis indicated the copolymer to be of low crystallinity.

A sample of this heptane-insoluble copolymer was cured for 45 minutes at 310° F. in the following vulcanization formula:

| Ingredients: | Parts |
|---|---|
| Heptane-insoluble copolymer | 100 |
| FEF carbon black | 50 |
| White lead | 5 |
| Hexamethylenediamine carbamate | 3 |

The vulcanized product was completely cross-linked, as indicated by 97% gel and 220% swell in toluene (4 hours at 80° C.). This vulcanizate had a Shore A2 hardness of 75 and had generally good physical properties, particularly good low temperature properties.

Another polymerization was made as described at the beginning of this example, except that the polymerization reaction was carried out at 62–75° C. for 19 hours to produce a heptane-insoluble copolymer in 61% yield based on the weight of the mixture of starting monomers. This product was a tough, snappy rubber having a reduced specific viscosity, $\eta sp/C$, of 5.8 as determined on a 0.1% solution of the copolymer in $\alpha$-chloronaphthalene at 100° C., and contained 24.7% epichlorohydrin and 75.3% trimethylene oxide. When vulcanized as described above, the vulcanizate had the following properties:

| | |
|---|---|
| Tensile strength, p.s.i. | 600 |
| 100% modulus, p.s.i. | 515 |
| Elongation, percent | 140 |
| Shore A2 hardness | 70 |
| Break set, percent | 5 |
| $T_{10,000}$, ° C. | −60 |
| Percent volume swell (48 hrs. at 80° F.): | |
|    In ASTM #3 oil | 30 |
|    In heptane | 45 |

*Example 3*

A polymerization vessel in which air had been replaced with nitrogen was charged with 36.5 parts of dry toluene, 8 parts of epichlorohydrin and 2 parts of 3,3-dimethyl oxetane and the vessel and contents were adjusted to 50° C. Then, at 50° C., there was added a quantity of catalyst made by prereacting 0.2 part of triisobutyl aluminum dissolved in 1.2 parts of a 50–50 mixture of ether and n-heptane with 0.009 part of water. Similar amounts of the same catalyst were additionally added to the agitated reaction mixture at 50° C. after elapsed polymerization reaction time of ½ hour, 1 hour, and 1½ hours, the total additional cataylst thus added being equivalent to 0.6 part of triisobutylaluminum, and the polymerization was continued at 50° C. with agitation for a total elapsed polymerization time of 2 hours.

The catalyst was prepared by diluting a 1 molar solution of triisobutylaluminum in n-heptane with sufficient ether to produce a 0.5 molar solution thereof in the mixed n-heptane-ether solvent and then adding thereto a quantity of water equivalent to 0.5 mole of water per mole of triisobutylaluminum slowly while stirring at 20° C., then stirring for 16 hours at 30° C., and storing at room temperature prior to use.

The polymerization was stopped after a total elapsed reaction time of 2 hours by adding 4 parts of anhydrous ethanol. The reaction mixture was then diluted with 4 volumes of n-heptane per volume of reaction mixture, and a heptane-insoluble copolymer was collected, washed twice with ether, washed once with anhydrous ethanol containing 1% of hydrogen chloride, washed neutral with methanol, washed once with methanol containing 0.4% of 4,4′-thiobis(6-tert-butyl-m-cresol), and the washed copolymer was dried 16 hours at 80° C. in vacuum. The resulting dried copolymer, obtained in 49% yield based on the weight of the mixture of starting monomers, was a tough, snappy rubber having a reduced specific viscosity, $\eta sp/C$, of 1.9 as determined on a 0.1% solution of the copolymer in $\alpha$-chloronaphthalene at 100° C. This largely amorphous copolymer contained 4.7% of 3,3-dimethyl oxetane and 95.3% epichlorohydrin based on chlorine analysis.

This heptane-insoluble copolymer was vulcanized by the procedure described in Example 2, except that 1 part hexamethylene diamine carbamate was used instead of 3 parts as set forth in Example 2. The vulcanized product had excellent strength and was very solvent resistant.

A soluble copolymer was recovered from the reaction mixture as follows: The n-heptane diluted reaction mixture, after separation from the n-heptane insoluble copolymer, was combined with the ether washes from the work-up of the n-heptane insoluble copolymer and the resultant mixture was washed twice with water containing 3% of hydrogen chloride, washed neutral with water, washed once with water containing 2% of sodium bicarbonate, again washed neutral with water, stabilized by adding 0.5% of 4,4′-thiobis(6-tert-butyl-m-cresol), based on polymer weight therein, after which solvent was stripped off by vacuum evaporation, and the copolymer was dried 16 hours in vacuum at 80° C. The resulting dried copolymer, obtained in 27% yield based on the weight of the mixture of starting monomers, was a viscous mass having a reduced specific viscosity, $\eta sp/C$, of 0.27 as determined on a 0.1% solution of the copolymer in $\alpha$-chloronaphthalene at 100° C.

*Example 4*

This example was carried out exactly like Example 3, with the exception that the total elapsed polymerization time was limited to 1 hour, and thus only half as much catalyst was used herein as was used in Example 3, half of the catalyst being added at the start of the polymerization, and the remainder after an elapsed polymerization time of ½ hour.

A heptane-insoluble copolymer which was a tough, snappy rubber was obtained in 11% yield based on the weight of the mixture of starting monomers, and had a reduced specific viscosity, $\eta sp/C$, of 2.2 as determined on a 0.1% solution of the copolymer in $\alpha$-chloronaphthalene at 100° C. This copolymer contained 4.3% of 3,3-dimethyl oxetane and 95.7% epichlorohydrin based on chlorine analysis. X-ray analysis indicated the copolymer to be largely amorphous. This heptane-insoluble copolymer was vulcanized by the same procedure described in Example 3 to produce a substantially equivalent vulcanized produce to that produced in Example 3.

A soluble copolymer which was a viscous mass was obtained in 25% yield based on the weight of the mixture of starting monomers, and had a reduced specific viscosity, $\eta sp/C$, of 0.33 as determined on a 0.1% solution of the copolymer in $\alpha$-chloronaphthalene at 100° C. This copolymer 75% of 3,3-dimethyl oxetane and 25% epichlorohydrin based on chlorine analysis. On standing at room temperature this copolymer became a soft wax having a high crystallinity of the pattern of poly(3,3-dimethyl oxetane) as determined by X-ray anaylsis.

*Example 5*

This example was like Example 3 except that 2 parts of 2-methyl oxetane were used in place of the 3,3-dimethyl oxetane of Example 3, and the additional catalyst (based on 0.6 part triisobutylaluminum) was added all at one time after an elapsed polymerization time of 4 hours, instead of in three equal portions after ½ hour, 1 hour, and 1½ hours as in Example 3. Total polymerization time was 24 hours at 50° C.

A heptane-insoluble copolymer, as well as a soluble copolymer were isolated and worked-up by the same procedure described in Example 3, except that during the catalyst removal step in the soluble copolymer isolation (acidified aqueous washes) some additional insoluble copolymer separated. This was collected, washed with ether, and then with ether containing 0.05% of 4,4′-thiobis(6-tert-butyl-m-cresol), after which is was dried in vacuum for 16 hours.

The first heptane-insoluble copolymer, obtained in 16.7% yield based on the weight of the mixture of starting monomers, was a tough, snappy rubber having a reduced specific viscosity of $\eta sp/C$, of 1.0 as determined on a 0.1% solution of the copolymer in $\alpha$-chloronaphthalene at 100° C. This copolymer contained 5% of 2-methyl oxetane and 95% of epichlorohydrin based on chlorine analysis. X-ray analysis indicated this copolymer to be largely amorphous.

The insoluble copolymer fraction which separated and was collected during work-up of the soluble copolymer was obtained in 3.1% yield based on the weight of the mixture of starting monomers, and was also a tough, snappy rubber. This copolymer had a reduced specific viscosity, $\eta sp/C$, of 0.8 as determined on a 0.1% solution of the copolymer in α-chloronaphthalene at 100%. This copolymer contained 6% of 2-methyl oxetane and 94% of epichlorohydrin as determined by chlorine analysis. X-ray analysis indicated this copolymer to be largely amorphous.

A sample of the first heptane-insoluble copolymer was vulcanized for 45 minutes at 310° F. in the following formula:

| Ingredients: | Parts |
|---|---|
| Heptane-insoluble copolymer | 100 |
| FEF carbon black | 50 |
| White lead | 5 |
| Hexamethylenediamine carbamate | 2 |

The vulcanized product was very thoroughly cross-linked, as indicated by 99.5% gel and 82.5% swell in toluene (4 hours at 80° C.).

*Example 6*

This example was like Example 3 except that 2 parts of trimethylene oxide were used in place of the 3,3-dimethyl oxetane of Example 3.

A heptane-insoluble copolymer, obtained in 16% yield based on the weight of the mixture of starting monomers, was a tough, snappy rubber having a reduced specific viscosity, ηsp/C, of 2.7 as determined on a 0.1% solution of the copolymer in α-chloronaphthalene at 100° C.

This copolymer contained 5% of trimethylene oxide and 95% of epichlorohydrin based on chlorine analysis, and was largely amorphous by X-ray analysis. It was vulcanized by the procedure described in Example 3 to give a strong, solvent resistant vulcanizate having good hysteresis and low temperature properties.

*Example 7*

This example was like Example 1 except that 9 parts of epichlorohydrin, 10 parts of trimethylene oxide and 1 part of propylene oxide were used in place of the 10 parts of epichlorohydrin and 10 parts of trimethylene oxide of Example 1. The ether-insoluble terpolymer obtained was a tough, rubbery, amorphous solid having a reduced specific viscosity greater than 3, and contained 67% epichlorohydrin, 13% trimethylene oxid and 20% propylene oxide. It was vulcanized by the procedure described in Example 2 to produce a strong, cross-linked rubber which was quantitatively insoluble in toluene at 80° C., and having good low temperature properties.

The ether-soluble, heptane-insoluble terpolymer was a tough rubber having a reduced specific viscosity of 1.1 and contained 35% epichlorohydrin, 50% trimethylene oxide and 15% propylene oxide.

What I claim and desire to protect by Letters Patent is:

1. An essentially linear, vulcanizable polyether copolymer of at least about 4% and not more than about 90% by weight of flexibilizing oxetane, at least about 10% and not more than about 96% by weight of epoxide containing at least one aliphatic halogen group, and not more than about 75% by weight of epoxide having the formula

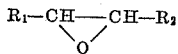

in which $R_1$ and $R_2$ are radicals selected from the group consisting of hydrogen, alkyl, alkoxyalkyl, and phenyl radicals, said copolymer having a weight average molecular weight of at least about 50,000; said flexibilizing oxetane having the formula

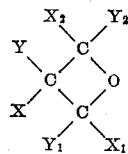

and selected from the group consisting of (1) where X, $X_1$, $X_2$, Y, $Y_1$ and $Y_2$ are all hydrogen, (2) where any one of X, $X_1$, $X_2$, Y, $Y_1$ and $Y_2$ is alkyl, alkoxy, alkoxymethyl, haloalkyl, haloalkoxy, and haloalkoxymethyl and the remainder are hydrogen, and (3) where each of X and Y is alkyl and $X_1$, $X_2$, $Y_1$ and $Y_2$ are hydrogen; and said epoxide containing at least one aliphatic halogen group having the formula

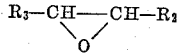

where $R_3$ is selected from the group consisting of haloalkyl and haloalkoxyalkyl and $R_4$ is selected from the group consisting of hydrogen, alkyl, haloalkyl and haloalkoxyalkyl.

2. A copolymer in accordance with claim 1 in which said flexibilizing oxetane is trimethylene oxide.

3. A copolymer in accordance with claim 1 in which said flexibilizing oxetane is a 2-alkyl oxetane.

4. A copolymer in accordance with claim 1 in which said flexibilizing oxetane is a 3-alkyl oxetane.

5. A copolymer in accordance with claim 1 in which said flexibilizing oxetane is a 3,3-dialkyl oxetane.

6. A copolymer in accordance with claim 1 in which said epoxide containing at least one aliphatic halogen group is an epihalohydrin.

7. A copolymer in accordance with claim 1 in which said flexibilizing oxetane is trimethylene oxide and said epoxide containing at least one aliphatic halogen group is epichlorohydrin.

8. A copolymer in accordance with claim 1 in which said flexibilizing oxetane is 2-methyl oxetane and said epoxide containing at least one aliphatic halogen group is epichlorohydrin.

9. A copolymer in accordance with claim 1 in which said flexibilizing oxetane is 3,3-dimethyl oxetane and said epoxide containing at least one aliphatic halogen group is epichlorohydrin.

10. A copolymer in accordance with claim 1 in which said flexibilizing oxetane is trimethylene oxide, said epoxide containing at least one aliphatic halogen group is epichlorohydrin, and said epoxide having the formula

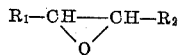

in which $R_1$ and $R_2$ are radicals selected from the group consisting of hydrogen, alkyl, alkoxyalkyl, ad phenyl radicals is propylene oxide.

11. An essentially linear, vulcanizable polyether copolymer of at least about 10% and not more than about 75% by weight of flexibilizing oxetane, at least about 25% and not more than about 90% by weight of epoxide containing at least one aliphatic halogen group, and not more than about 50% by weight of epoxide having the formula

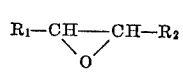

in which $R_1$ and $R_2$ are radicals selected from the group consisting of hydrogen, alkyl, alkoxyalkyl, and phenyl radicals, said copolymer having a weight average molecular weight of at least about 50,000; said flexibilizing oxetane having the formula

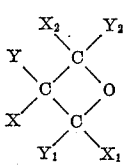

and selected from the group consisting of (1) where X, $X_1$, $X_2$, Y, $Y_1$, and $Y_2$ are all hydrogen, (2) where any one of X, $X_1$, $X_2$, Y, $Y_1$ and $Y_2$ is alkyl, alkoxy, alkoxymethyl, haloalkyl, haloalkoxy, and haloalkoxymethyl and the remainder are hydrogen, and (3) where each of X and Y is alkyl and $X_1$, $X_2$, $Y_1$ and $Y_2$ are hydrogen; and said epoxide containing at least one aliphatic halogen group having the formula

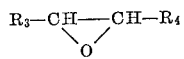

where $R_3$ is selected from the group consisting of haloalkyl and haloalkoxyalkyl and $R_4$ is selected from the group consisting of hydrogen, alkyl, haloalkyl and haloalkoxyalkyl.

References Cited

UNITED STATES PATENTS

| | | | |
|---|---|---|---|
| 2,891,837 | 6/1959 | Campbell | 260—2 |
| 3,026,270 | 3/1962 | Robinson | 260—2 |
| 3,026,305 | 3/1962 | Robinson | 260—2 |
| 3,027,352 | 3/1962 | Waling et al. | 260—2 |
| 3,110,688 | 11/1963 | Campbell | 260—2 |
| 3,242,103 | 3/1966 | Uelzmann | 260—2 |

FOREIGN PATENTS 599,067  5/1960  Canada.

SAMUEL H. BLECH, *Primary Examiner.*

WILLIAM H. SHORT, *Examiner.*

T. D. KERWIN, T. PERTRILLA, *Assistant Examiners.*

UNITED STATES PATENT OFFICE

CERTIFICATE OF CORRECTION

Patent No. 3,341,475                          September 12, 1967

Edwin J. Vandenberg

It is hereby certified that error appears in the above numbered patent requiring correction and that the said Letters Patent should read as corrected below.

Column 12, line 37, before "75%" insert -- contained --; column 13, line 1, for "100%" read -- 100° C. --; column 14, lines 7 and 8, for the right-hand portion of the formula reading "———$R_2$" read -- ———$R_4$ --; column 14, line 45, for "ad" read -- and --.

Signed and sealed this 24th day of September 1968.

(SEAL)
Attest:

Edward M. Fletcher, Jr.                               EDWARD J. BRENNER

Attesting Officer                                            Commissioner of Patents